US012465870B2

(12) United States Patent

Zelt et al.

(10) Patent No.: US 12,465,870 B2

(45) Date of Patent: Nov. 11, 2025

(54) INFLATABLE DECORATION SYSTEM AND METHOD

(71) Applicants: Aaron Zelt, El Cajon, CA (US); Andrew Zelt, El Cajon, CA (US)

(72) Inventors: Aaron Zelt, El Cajon, CA (US); Andrew Zelt, El Cajon, CA (US)

( * ) Notice: Subject to any disclaimer, the term of this patent is extended or adjusted under 35 U.S.C. 154(b) by 244 days.

(21) Appl. No.: 18/213,140

(22) Filed: Jun. 22, 2023

(65) Prior Publication Data

US 2024/0009585 A1 Jan. 11, 2024

Related U.S. Application Data

(60) Provisional application No. 63/359,012, filed on Jul. 7, 2022.

(51) Int. Cl.

| | |
|---|---|
| ***A63H 27/10*** | (2006.01) |
| ***A63H 13/16*** | (2006.01) |
| ***G09F 19/00*** | (2006.01) |

(52) U.S. Cl.

CPC ........... *A63H 27/10* (2013.01); *G09F 19/008* (2021.05); *A63H 2027/1008* (2013.01); *A63H 2027/1033* (2013.01); *A63H 2027/1058* (2013.01); *A63H 2027/1066* (2013.01)

(58) Field of Classification Search

CPC .... A63H 13/16; A63H 27/10; A63H 27/1008; A63H 33/40; G09F 19/008

See application file for complete search history.

(56) References Cited

U.S. PATENT DOCUMENTS

| | | | | |
|---|---|---|---|---|
| 3,159,935 | A | 12/1964 | Rubens | |
| 5,083,771 | A | 1/1992 | Tyner | |
| 5,152,092 | A | 10/1992 | O'Brien | |
| 5,579,813 | A | 12/1996 | Watts | |
| 5,935,013 | A * | 8/1999 | McLennan ............. | A63H 27/10 472/54 |
| 6,322,230 | B1 | 11/2001 | Medici | |
| 6,786,793 | B1 * | 9/2004 | Wang ...................... | A63H 27/10 446/176 |
| 6,804,905 | B1 | 10/2004 | Burger, III et al. | |
| 6,892,772 | B1 * | 5/2005 | Wang ...................... | G09F 19/02 141/94 |
| 7,216,446 | B2 | 5/2007 | Machala | |
| 11,229,309 | B2 | 1/2022 | Hart et al. | |
| 11,623,156 | B1 * | 4/2023 | Medwed .................. | A63H 3/02 446/369 |
| 2006/0107573 | A1 | 5/2006 | Machala | |
| 2007/0141947 | A1 * | 6/2007 | Chin-Cheng ....... | G09F 15/0025 446/220 |
| 2017/0072328 | A1 | 3/2017 | Sze | |
| 2019/0318673 | A1 | 10/2019 | Newton | |
| 2021/0267402 | A1 | 9/2021 | Hart et al. | |

* cited by examiner

*Primary Examiner* — John A Ricci

(74) *Attorney, Agent, or Firm* — Procopio, Cory, Hargreaves and Savitch LLP

(57) ABSTRACT

An inflatable decoration system and method comprising an inflatable decoration that deploys from and deflates into a decorative box, eliminating the eyesore aspect of inflatable holiday yard decorations of the past.

21 Claims, 8 Drawing Sheets

INFLATABLE DECORATION SYSTEM AND METHOD

CROSS REFERENCE TO RELATED APPLICATION

This application claims the benefit of U.S. Provisional Patent Application No. 63/359,012, filed Jul. 7, 2022, under 35 U.S.C. 119 and is incorporated by reference herein.

FIELD OF THE INVENTION

The present invention relates to inflatable decorations.

BACKGROUND

Inflatable holiday yard decorations include an inflatable member in the shape of snowman, ghost, etc., a fan, and an interior light. In operation, the fan maintains the inflatable member in an inflated condition. When the fan is turned off, the inflatable member deflates. The deflated inflatable member in a front yard is an eyesore to neighbors.

SUMMARY

An aspect of the disclosure involves an inflatable decoration system and method where an inflatable decoration deploys from and deflates into a decorative box, eliminating the eyesore aspect of inflatable holiday yard decorations of the past.

Another aspect of the disclosure involves an inflatable decoration system comprising a decorative box; an inflatable decoration deployable out from and deflatable back into the decorative box.

1. One or more implementations of the above aspect of the disclosure involves one or more of the following: the decorative box includes a lid motor and a retractable lid operably coupled to the lid motor to open the lid to allow the inflatable decoration to deploy from or deflate back into the decorative box, and close the lid after the inflatable decoration deflates into the decorative box; the decorative box includes a fan to inflate the inflatable decoration; one or more lights to illuminate the inflatable decoration; a guide mechanism that guides the inflatable decoration back into the decorative box upon deflation of the inflatable decoration; the guide mechanism that guides the inflatable decoration back into the decorative box upon deflation of the inflatable decoration is configured to retract the inflatable decoration back into the decorative box upon deflation of the inflatable decoration; the guide mechanism that guides the inflatable decoration back into the decorative box upon deflation of the inflatable decoration is configured to guide the inflatable decoration centrally inward back into the decorative box upon deflation of the inflatable decoration; the guide mechanism includes one or more retraction lines, elastic wirings, elastic strings, retractable lanyards, or bungee cords; the guide mechanism includes one or more retraction lines coupled to the inflatable decoration and a reel that reels in and out the one or more retraction lines to reel in and reel out the inflatable decoration; the decorative box includes a base with a central area and the inflatable decoration includes an interior surface and the guide mechanism couples the central area of the base to the interior surface of the inflatable decoration; the decorative box includes a motor and a raiseable and lowerable frame operably coupled to the motor to raise and lower the raiseable and lowerable frame; a scissors mechanism operably coupling the motor and the raiseable and lowerable frame to raise and lower the raiseable and lowerable frame.

A further aspect of the disclosure involves a method of using an inflatable decoration system including a decorative box; an inflatable decoration deployable out from and deflatable back into the decorative box, comprising inflating the inflatable decoration so that the inflatable decoration deploys out from the decorative box; deflating the inflatable decoration so that the inflatable decoration deflates back into the decorative box.

One or more implementations of the above aspect of the disclosure involves one or more of the following: the decorative box includes a lid motor and a retractable lid operably coupled to the lid motor, and the method further comprising operating the lid motor to open the lid to allow the inflatable decoration to deploy from the decorative box; operating the lid motor to close the lid after the inflatable decoration deflates back into the decorative box; the decorative box includes a guide mechanism that guides the inflatable decoration back into the decorative box upon deflation of the inflatable decoration, and the method further comprising guiding the inflatable decoration with the guide mechanism back into the decorative box upon deflation of the inflatable decoration; guiding includes retracting the inflatable decoration with the guide mechanism back into the decorative box upon deflation of the inflatable decoration; guiding includes guiding the inflatable decoration with the guide mechanism centrally inward back into the decorative box upon deflation of the inflatable decoration; the guide mechanism includes one or more retraction lines coupled to the inflatable decoration and a reel that reels in and out the one or more retraction lines to reel in and reel out the inflatable decoration, and guiding includes reeling in the one or more retraction lines to reel in the inflatable decoration back into the decorative box upon deflation of the inflatable decoration; the decorative box includes a motor and a raiseable and lowerable frame operably coupled to the motor to raise and lower the raiseable and lowerable frame, and the method further comprising operating the motor to raise and lower the raiseable and lowerable frame.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
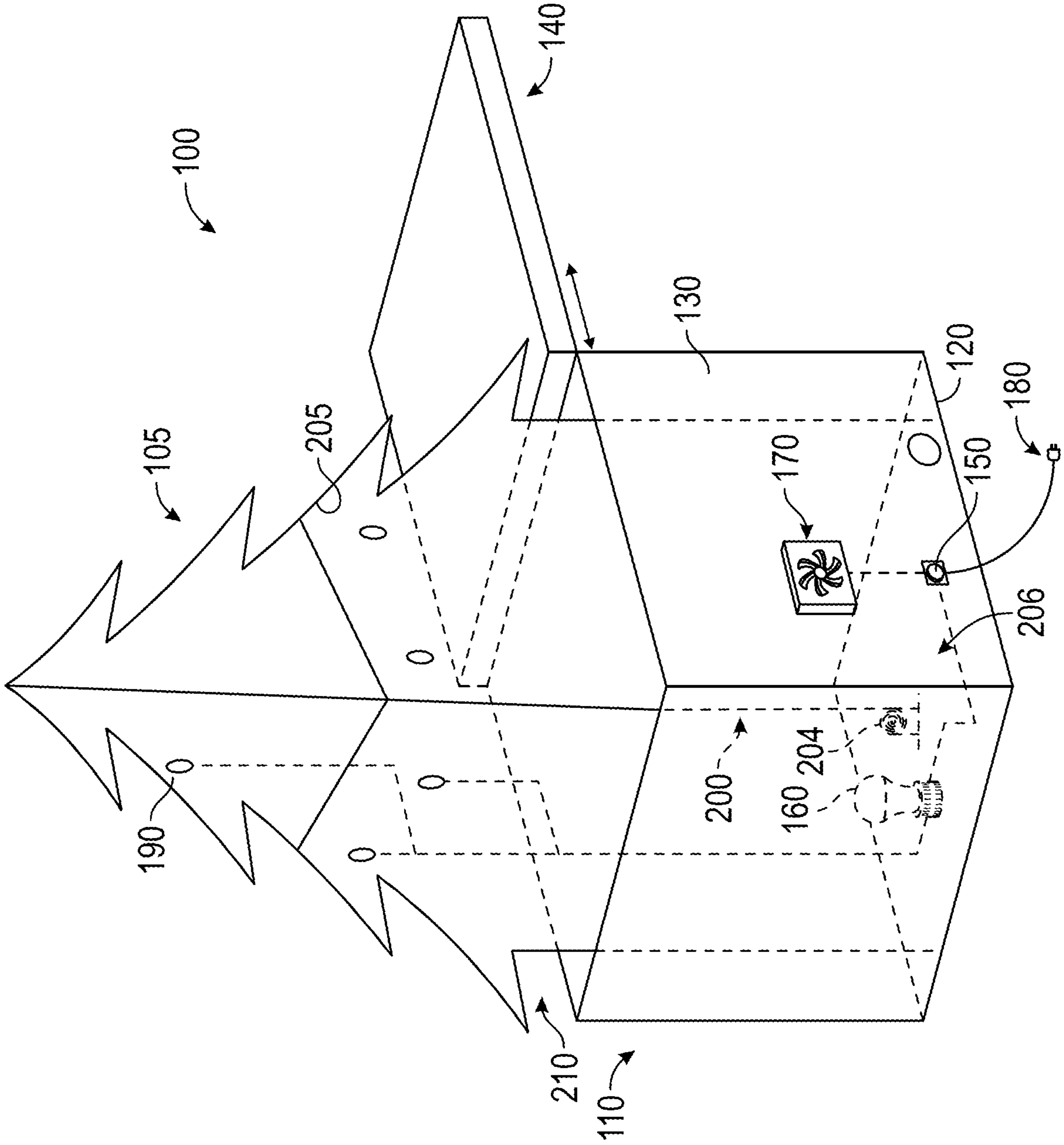
FIG. 1 is a perspective view of an embodiment of an inflatable decoration system.

With reference to FIG. 1, an embodiment of an inflatable decoration system 100 will be described. The inflatable decoration system 100 includes an inflatable decoration 105 that deploys from and collapses within a decorative box ("box") 110 having a base 120, rigid sides 130, and retractable lid 140. The box 110 may be decorated for specific holidays (e.g., Christmas, Halloween). The box 110 may be the skeletal structure of a cube (or other rectangular/rectilinear box or curvilinear box). This skeletal structure can be constructed out of a variety of materials, such as metals or plastics. The box 110 includes an on/off switch 150, light(s) 160, and a fan/blower 170 that are coupled to a cord/plug 180 for powering (e.g., via an extension cord and AC outlet) the inflatable decoration system 100. In an alternative embodiment, the light(s) 160 may be in/on the inflatable decoration 105.

The inflatable decoration 105 may also include light(s) 190 that are coupled to a cord/plug 180 for powering the light(s) 190. A retractable mechanism or guide mechanism 200 inside the inflatable decoration 105 pulls and guides the inflatable decoration 105 back into the box 110 when the inflatable decoration 105 is deflated (i.e., when fan 170 is turned off). The retractable mechanism 200 may include a retraction line(s) 204 (e.g., elastic wiring/strings/bungee cord that create tension naturally when elongated/stretched) attached to various parts/points of an interior surface 205 of the inflatable decoration 105 and also connected to a central area 206 of the base 120 via coupling 204. The tension in the elastic wiring/strings of the retraction line(s) 204 goes away as the string is able to return to its natural state once the air pressure from the fan 170 has subsided. This automatically draws the string centrally inward and downward toward the coupling 204 in the central area 206 of the base 120 of the box 110.

Alternatively, the retractable mechanism 200 may be a retractable lanyard or a base/reel motor 202 coupled to a reel for reeling in/out a retraction line 204 for retracting/deploying the inflatable decoration 105. As the wiring/strings of the retraction line(s) 204 retract, they are pulled down towards the center of the base 120 and in turn ensure the inflatable decoration 105 deflates in a controlled manner that is centered downwards more than collapsing to any particular side.

The retractable lid 140 moves/retracts laterally/horizontally in a plane parallel to a plane defined by the base 120 to uncover/cover a top 210 of the box 110 when the inflatable decoration 105 is inflated/deflated. A lid motor 212 (FIG. 3) is coupled to the retractable lid 140 for uncovering/covering the top 210 of box 110. When the lid motor 212 causes the lid 140 to retract laterally, the inflatable decoration 105 is allowed to expand out.

Figure 2:
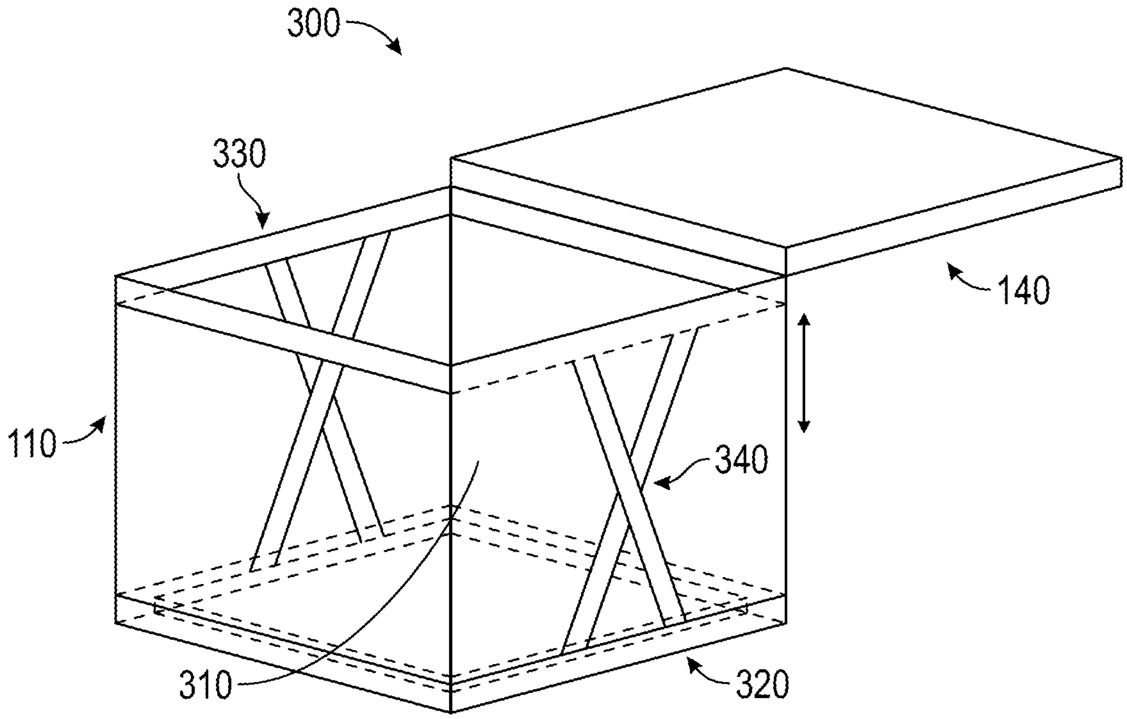
FIG. 2 is a perspective view of another embodiment of a box of another embodiment of an inflatable decoration system.

With reference to FIG. 2, in an alternative embodiment of an inflatable decoration system 300, in which like elements are shown with the same reference numbers as those in FIG. 1 and the above description of such elements is incorporated herein, and which only shows the box 110 (without the inflatable decoration), the box 110 collapses/lowers with inflation of the inflatable decoration and an expands/rises with deflation of the inflatable decoration. The box 110 includes collapsible/flexible material sides 310 made from nylon and/or other synthetic material, lower rectangular frame 320, and an upper rectangular frame 330 operably coupled by a collapsible/expandable mechanism (e.g., scissors mechanism) 340. The collapsible/expandable scissors mechanism 340 is coupled to a collapsible/expandable scissors mechanism ("C/E") motor 350 (FIG. 3) for lowering/raising the upper rectangular frame 330 relative to the lower rectangular frame 320 for collapsing/lowering the box 110/sides 310 with inflation of the inflatable decoration and expanding/rising the box 110/sides 310 with deflation of the inflatable decoration.

Figure 3:
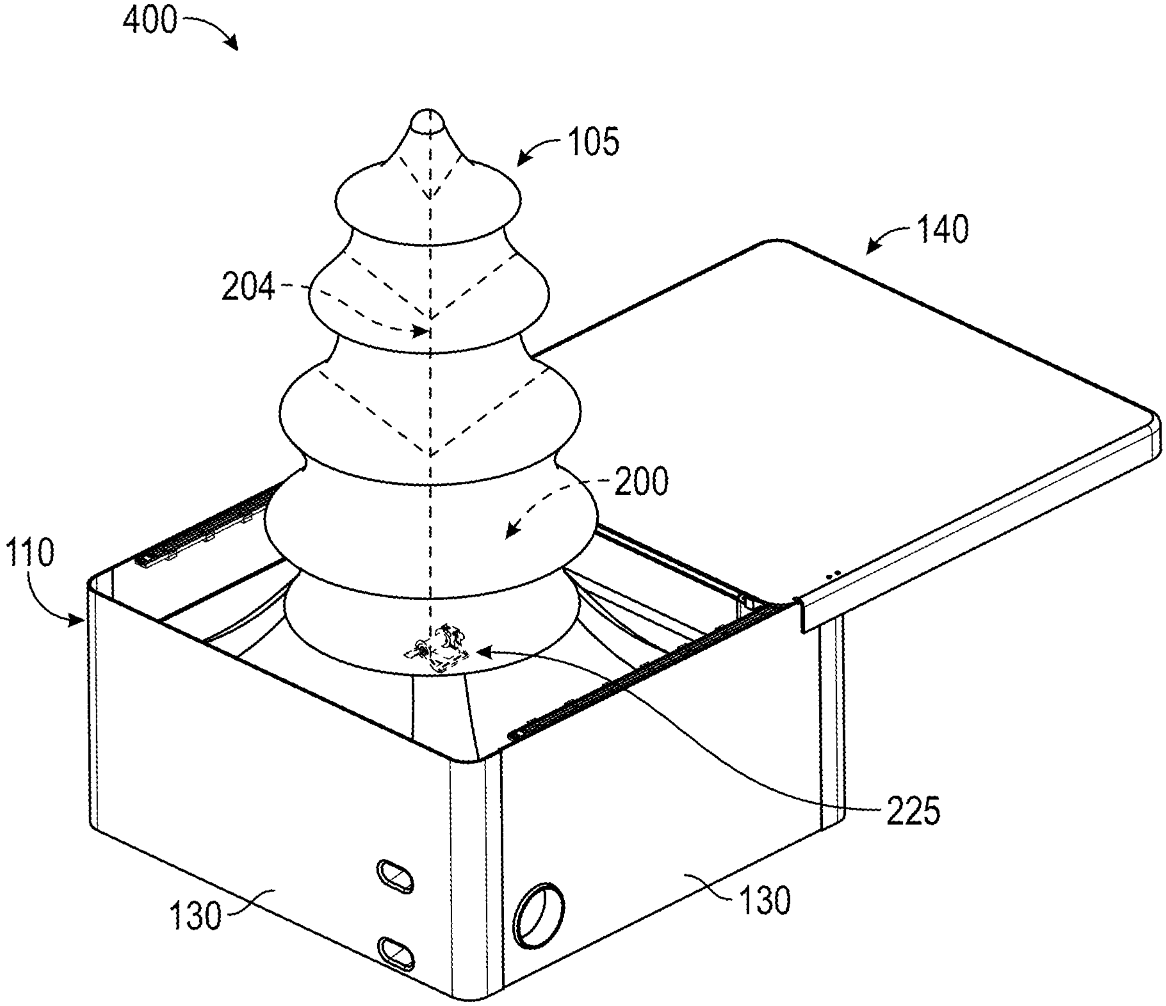
FIG. 3 is a perspective view of an additional embodiment of an inflatable decoration system.
Figure 4:
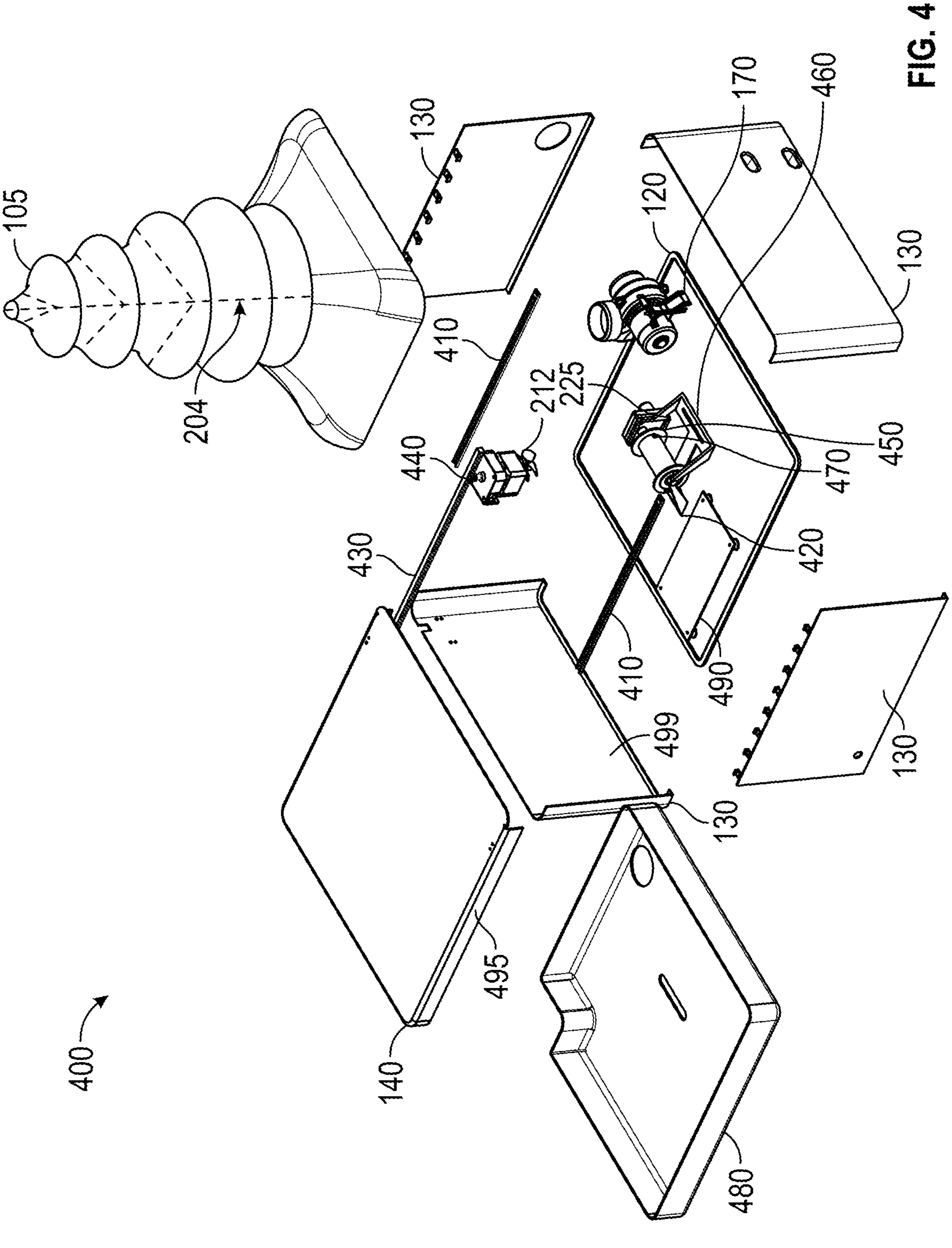
FIG. 4 is a perspective exploded view of the inflatable decoration system of FIG. 3.

With reference to FIGS. 3 and 4, in another embodiment of an inflatable decoration system 400, in which like elements are shown with the same reference numbers as those in FIG. 1 and the above description of such elements is incorporated herein, the inflatable decoration system 400 includes side panel/rigid sides 130, base plate/base 120, DC blower/fan 170, long guide rail for lower-profile sleeve bearing carriage 410, low-profile sleeve bearing carriage 420, gear rack 430, gear 440, compact AC gearmotor/lid motor 212, spool 450, DC gearmotor/base motor 225, spool bracket 460, spool connector 470, floor plate 480, lid 140, PCB 490, retraction line(s) 204, light(s) 160, and decoration 105. The inflatable decoration system 400 is generally similar to the inflatable decoration system 100 of FIG. 1, but the compact AC gearmotor/lid motor 212 is operably associated with the gear rack 430 attached to the lid 140 whereby operation of the AC gearmotor/lid motor 212 imparts motion to the lid 140 so that sleeves 495 of the lid 140 travel along the long guide rails 410 of lower-profile sleeve bearing carriage 420 to open/close lid 140. Further, DC gearmotor/base motor 225 is operably coupled to the retraction line(s) 204 via spool 450 to form retractable mechanism or guide mechanism 200. The decoration 105 includes a rectangular base 498 sealed and secured to inner sides 499 of side panel/rigid sides 130, and the base plate/base 120 is received in the floor plate 480. The DC blower/fan 170 is used to inflated the decoration 105, and the PCB 490 includes a controller 536 (FIG. 7) to control the inflatable decoration system 400 as described herein.

Figure 5:
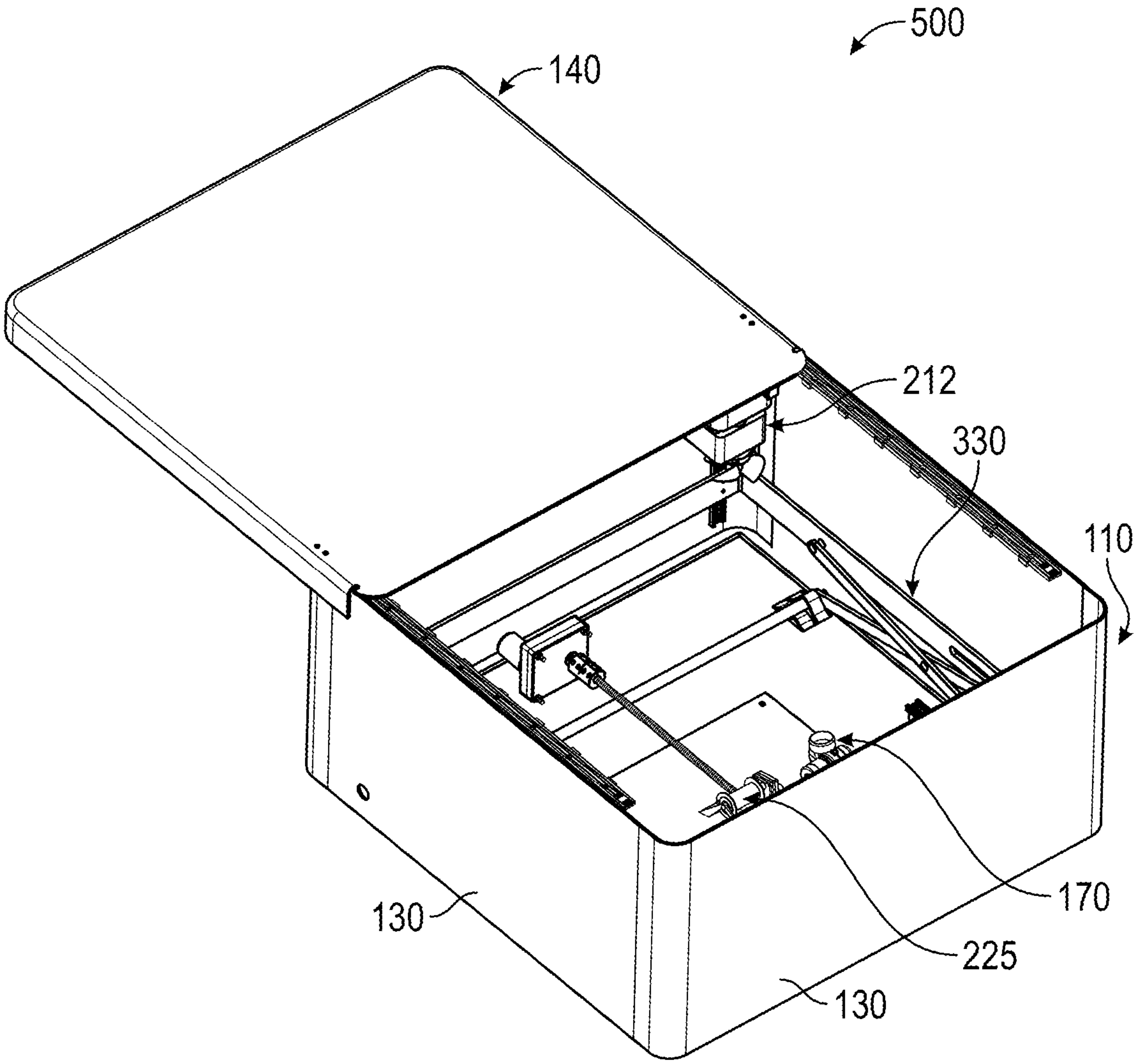
FIG. 5 is a perspective view of a further embodiment of an inflatable decoration system.
Figure 6:
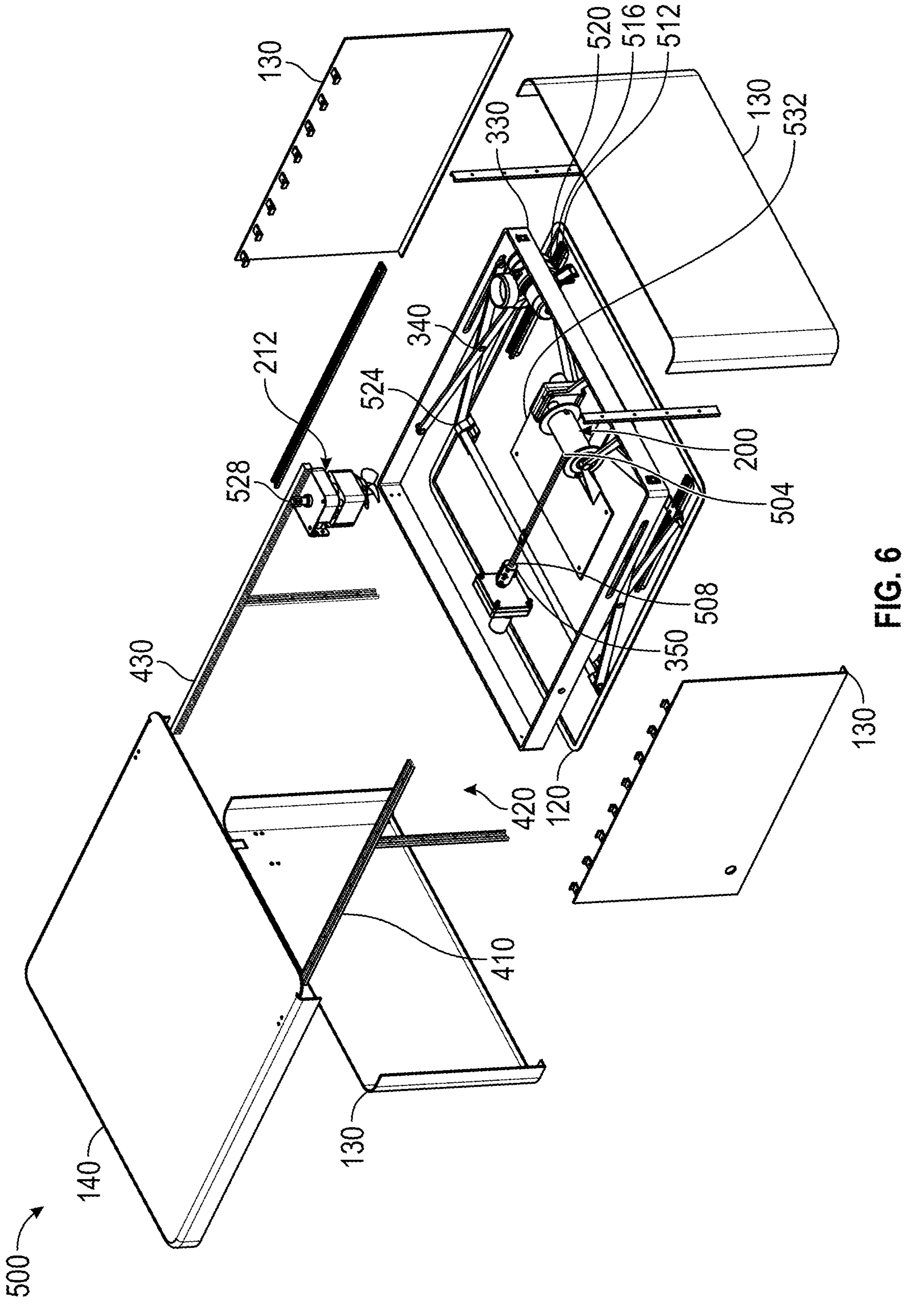
FIG. 6 is a perspective exploded view of the inflatable decoration system of FIG. 5.

With reference to FIGS. 5 and 6, in a further embodiment of an inflatable decoration system 500, in which like elements are shown with the same reference numbers as those in FIGS. 1-3 and the above description of such elements is incorporated herein, the inflatable decoration system 500 is collapsible/expandable, and includes side panels/sides 130, base plate/base 120, collapsible/expandable scissors mechanism ("C/E") motor 350, threaded rod 504, clamping shaft 508, gear rack 430, long guide rail for lower-profile sleeve bearing carriage 410, low-profile sleeve bearing carriage 420, low-profile sleeve bearing carriage 516, traverse 520, bottom shaft 524, scissor arm/scissors mechanism 340, lifting platform/rectangular frame 330, side panel/sides 130, lid 140, gear 528, AC gearmotor/lid motor 212, light(s) 160, and PCB 532. The inflatable decoration system 500 is generally similar to the inflatable decoration system 100 of FIG. 2 and, similarly, the sides 130 may be collapsible/flexible (e.g., made from nylon and/or other synthetic material) like collapsible/flexible material sides 310 so that they collapse/drop down with the scissor arm/scissors mechanism 340, creating a low profile while the decoration 105 is inflated. The compact AC gearmotor/lid motor 212 opens/closes the lid 140, the retractable mechanism or guide mechanism 200 retracts the decoration 105, and the DC blower/fan 170 inflates the decoration 105 in the same manner as that described above with respect to FIGS. 3, 4, but the collapsible/expandable scissors mechanism ("C/E")

motor 350 is operatively associated (e.g., via threaded rod 504, clamping shaft 508, long guide rail for lower-profile sleeve bearing carriage 512, low-profile sleeve bearing carriage 516, traverse 520, and bottom shaft 524) with the scissor arm/scissors mechanism 340 to raise/lower the lifting platform/rectangular frame 330 and the collapsible/flexible sides 130.

Figure 7:
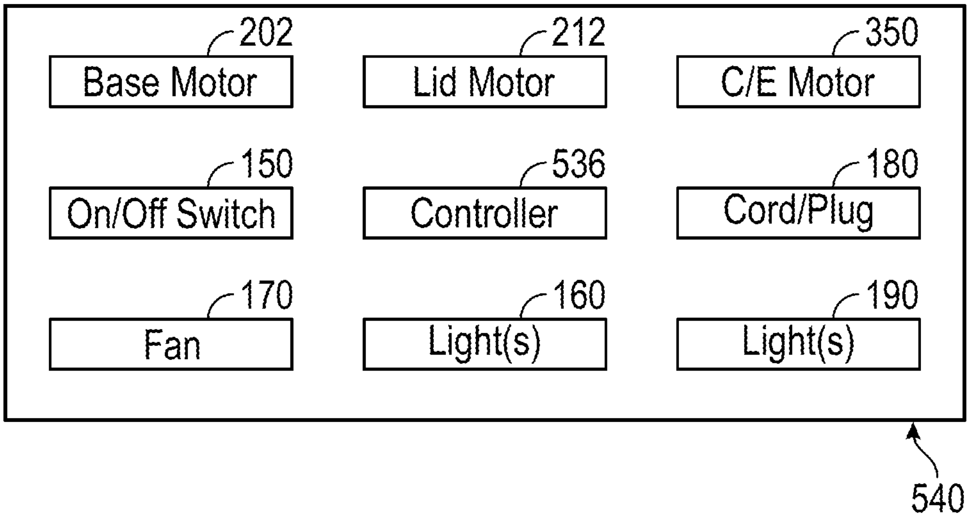
FIG. 7 is an electrical schematic an embodiment of an inflatable decoration system.
Figure 8:
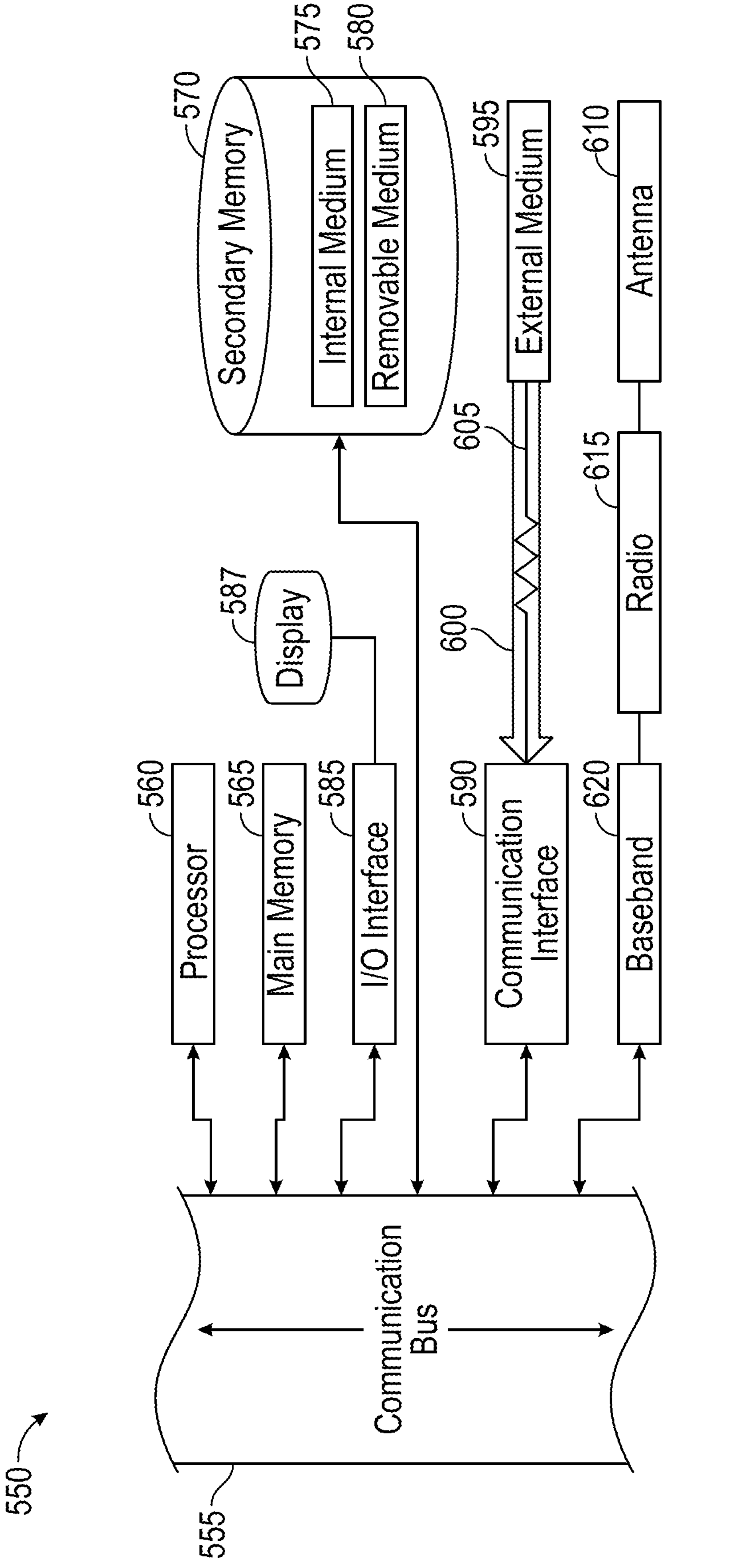
FIG. 8 is a block diagram illustrating an example wired or wireless processor enabled device that may be used in connection with various embodiments described herein.

With reference to FIG. 7, electrical components 540 of the inflatable decoration system 100, 300, 400, 500 include one or more of controller 536, on/off switch 150, light(s) 160, fan 170, cord/plug 180, light(s) 190, C/E motor 350, base motor 202, and/or lid motor 212.

The inflatable decoration system 100, 300, 400, 500 will now be described in use. Initially, the decorative box 110 sits on the ground while turned off and displays as item such as Christmas present, coffin, etc. When the inflatable decoration system 100, 300, 400, 500 is turned on, the inflatable decoration 105 inside expands out of the rigid box 110. In an exemplary method of use, the inflatable decoration system 100, 300, 400, 500 is manually turned on by switching on the on/off switch 150. The retractable lid 140 moves/retracts laterally/horizontally in a plane parallel to a plane defined by the base 120 to uncover a top 210 of the box 110. On the decorative box 110 with the lifting platform/rectangular frame 330 that raises/lowers, after the lid 140 retracts, the lifting platform/rectangular frame 330 lowers, which in the embodiment of FIG. 3 lowers the profile of the box sides 310. The light(s) 160 and the fan/blower 170 turn on, for example, after 5 seconds. and the inflatable decoration 105 is inflated so that the inflatable decoration 105 extends out of and/or over the box 110 as long as the inflatable decoration system 100, 300, 400, 500 is on.

Next, the inflatable decoration system 100, 300, 400, 500 is turned off by switching off the on/off switch 150. The light(s) 160 and the fan/blower 170 turn off. The retractable mechanism 200 disposed inside the inflatable decoration 105 guides the object when the fan 170 is turned off. This unique way of guiding the deflating inflatable decoration 105, allows the inflatable decoration 105 to deflate into an exact location. This ensures that the inflatable decoration 105 will deflate back into the box 110 precisely and not flop or lay over the edges of the box 110. After a predetermined of time (e.g., 5 minutes after the light(s) 160 and the fan/blower 170 turn off), the retractable lid 140 automatically moves/retracts laterally/horizontally in a plane parallel to a plane defined by the base 120 to cover a top 210 of the box 110. Alternatively, in the box 110 with collapsible sides 310 of FIG. 2, the sides 130 will raise and the lid 140 will close automatically. When the inflatable decoration 105 is deflated and stored away inside the box 110, the box 110 looks like a present or other desirable holiday object in one's yard, instead of looking like an unsightly deflated balloon.

If a timer is used, the timer may, for example, be set to turn on at 5 p.m. and off at 10 p.m. At 5 p.m., the retractable lid 140 moves/retracts laterally/horizontally in a plane parallel to a plane defined by the base 120 to uncover a top 210 of the box 110. The light(s) 160 and the fan/blower 170 turn on, for example, after 5 seconds, and the inflatable decoration 105 is inflated so that the inflatable decoration 105 extends out of and/or over the box 110. At 10 p.m., the light(s) 160 and the fan/blower 170 turn off After a predetermined of time (e.g., 5 minutes after the light(s) 160 and the fan/blower 170 turn off), the retractable lid 140 automatically moves/retracts laterally/horizontally in a plane parallel to a plane defined by the base 120 to cover a top 210 of the box 110.

FIG. 6 is a block diagram illustrating an example wired or wireless system 550 that may be used in connection with various embodiments described herein. For example, but not by way of limitation, the system 550 may be used as or in conjunction with the controller 536 of FIG. 7 for controlling the inflatable decoration system 100, 300, 400, 500. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display 587. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network (or otherwise described herein). The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An inflatable decoration system, comprising:

a decorative box;

an inflatable decoration deployable out from and deflatable back into the decorative box, wherein the decorative box includes a motor and a raiseable and lowerable frame operably coupled to the motor to raise and lower the raiseable and lowerable frame.

2. The inflatable decoration system of claim 1, wherein the decorative box includes a lid motor and a retractable lid operably coupled to the lid motor to open the lid to allow the inflatable decoration to deploy from or deflate back into the decorative box, and close the lid after the inflatable decoration deflates into the decorative box.

3. The inflatable decoration system of claim 1, wherein the decorative box includes a fan to inflate the inflatable decoration.

4. The inflatable decoration system of claim 1, further including one or more lights to illuminate the inflatable decoration.

5. The inflatable decoration system of claim 1, further including a guide mechanism that guides the inflatable decoration back into the decorative box upon deflation of the inflatable decoration.

6. The inflatable decoration system of claim 5, wherein the guide mechanism that guides the inflatable decoration back into the decorative box upon deflation of the inflatable decoration is configured to retract the inflatable decoration back into the decorative box upon deflation of the inflatable decoration.

7. The inflatable decoration system of claim 5, wherein the guide mechanism that guides the inflatable decoration back into the decorative box upon deflation of the inflatable decoration is configured to guide the inflatable decoration centrally inward back into the decorative box upon deflation of the inflatable decoration.

8. The inflatable decoration system of claim 5, wherein the guide mechanism includes one or more retraction lines, elastic wirings, elastic strings, retractable lanyards, or bungee cords.

9. The inflatable decoration system of claim 5, wherein the guide mechanism includes one or more retraction lines coupled to the inflatable decoration and a reel that reels in and out the one or more retraction lines to reel in and reel out the inflatable decoration.

10. The inflatable decoration system of claim 5, wherein the decorative box includes a base with a central area and the inflatable decoration includes an interior surface and the guide mechanism couples the central area of the base to the interior surface of the inflatable decoration.

11. The inflatable decoration system of claim 1, further including a scissors mechanism operably coupling the motor and the raiseable and lowerable frame to raise and lower the raiseable and lowerable frame.

12. A method of using the inflatable decoration system of claim 1, comprising:

inflating the inflatable decoration so that the inflatable decoration deploys out from the decorative box;

deflating the inflatable decoration so that the inflatable decoration deflates back into the decorative box.

13. The method of claim 12, wherein the decorative box includes a lid motor and a retractable lid operably coupled to the lid motor, and the method further comprising:

operating the lid motor to open the lid to allow the inflatable decoration to deploy from the decorative box;

operating the lid motor to close the lid after the inflatable decoration deflates back into the decorative box.

14. The method of claim 12, wherein the decorative box includes a guide mechanism that guides the inflatable decoration back into the decorative box upon deflation of the inflatable decoration, and the method further comprising:

guiding the inflatable decoration with the guide mechanism back into the decorative box upon deflation of the inflatable decoration.

15. The method of claim 14, wherein guiding includes retracting the inflatable decoration with the guide mechanism back into the decorative box upon deflation of the inflatable decoration.

16. The method of claim 14, wherein guiding includes guiding the inflatable decoration with the guide mechanism centrally inward back into the decorative box upon deflation of the inflatable decoration.

17. The method of claim 14, wherein the guide mechanism includes one or more retraction lines coupled to the inflatable decoration and a reel that reels in and out the one or more retraction lines to reel in and reel out the inflatable decoration, and guiding includes reeling in the one or more retraction lines to reel in the inflatable decoration back into the decorative box upon deflation of the inflatable decoration.

18. The method of claim 12, wherein the decorative box includes a motor and a raiseable and lowerable frame operably coupled to the motor to raise and lower the raiseable and lowerable frame, and the method further comprising:

operating the motor to raise and lower the raiseable and lowerable frame.

19. The inflatable decoration system of claim 1, further comprising a guide mechanism including multiple retraction lines attached to predefined points on an interior surface of the inflatable decoration, the lines operably connected to a central reel or elastic structure positioned on the raiseable and lowerable frame, wherein the guide mechanism is configured to apply centrally inward pulling force during deflation of the inflatable decoration.

20. The inflatable decoration system of claim 19, wherein the guide mechanism comprises a controller configured to adjust the retraction force or sequence based on timing intervals, inflation state, or pressure sensors within the inflatable decoration.

21. The inflatable decoration system of claim 19, wherein the guide mechanism is configured to maintain the inflatable decoration within a defined perimeter during deflation to prevent collapse or overflow beyond the decorative box.

* * * * *